H. L. WATSON.
CONTROL MECHANISM.
APPLICATION FILED DEC. 6, 1920.
1,401,744.
Patented Dec. 27, 1921.
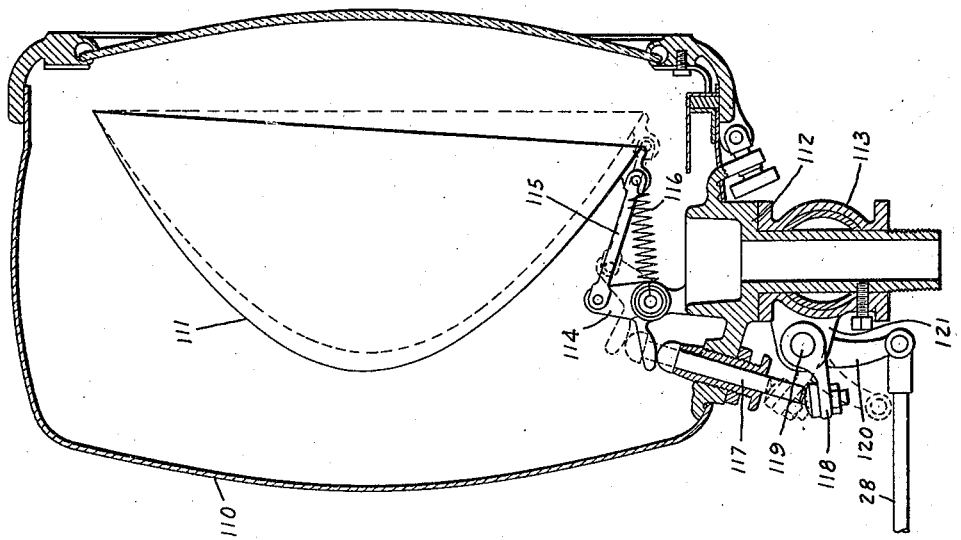
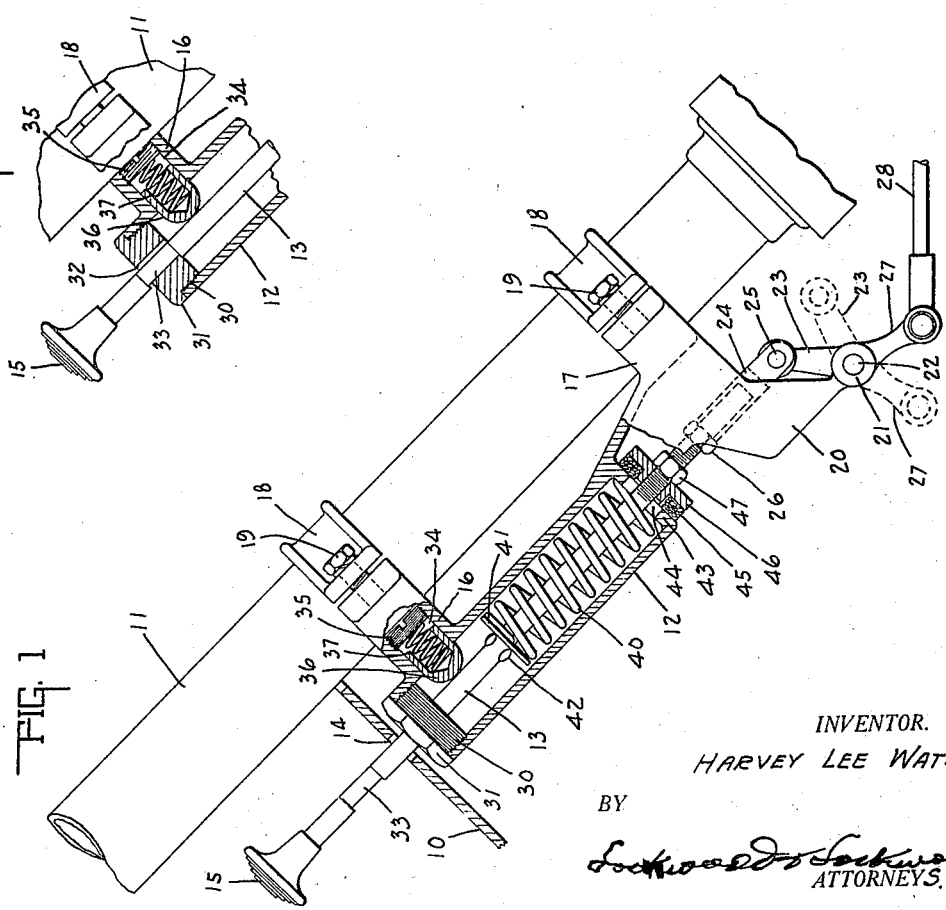
INVENTOR.
HARVEY LEE WATSON.
BY
Lockwood & Lockwood
ATTORNEYS.

UNITED STATES PATENT OFFICE.

HARVEY LEE WATSON, OF INDIANAPOLIS, INDIANA, ASSIGNOR, BY MESNE ASSIGNMENTS, TO C. M. HALL LAMP COMPANY, A CORPORATION OF MICHIGAN.

CONTROL MECHANISM.

1,401,744.  Specification of Letters Patent.  Patented Dec. 27, 1921.

Application filed December 6, 1920. Serial No. 428,748.

*To all whom it may concern:*

Be it known that I, HARVEY LEE WATSON, a citizen of the United States, and a resident of Indianapolis, county of Marion, and State of Indiana, have invented a certain new and useful Control Mechanism; and I do hereby declare that the following is a full, clear, and exact description thereof, reference being had to the accompanying drawings, in which like numerals refer to like parts.

This invention relates to the tilting mechanism associated with the headlight construction upon a motor vehicle.

The chief object of this invention is to provide means positioned adjacent the foot board or toe board of a motor vehicle which is adapted to be operated by the foot of the driver of the motor vehicle such that the driver's attention will not be diverted from the driving to the lighting, but may be maintained upon the driving of the vehicle at all times.

The chief feature of this invention consists in providing means for maintaining the tiltable headlight construction in the straight-away or forward position, and means for moving the actuating mechanism to the tilted position, and the maintaining of said actuating mechanism in said position, thereby insuring that the headlight construction will be positively maintained in either of its positions until such time as the driver of the vehicle desires to change the same from one position to the other position.

Another feature of the invention consists in positioning the actuating mechanism adjacent the toe board of the motor vehicle and supporting said mechanism upon the steering post of said vehicle.

Other features of the invention relate to the detail construction of the same.

The full nature of the invention will be understood from the accompanying drawings and the following description and claims.

In the drawings, Figure 1 is a side elevational view of the actuating mechanism showing the same positioned upon the steering post of a motor vehicle and associated with the toe board thereof, the housing being sectionalized and broken away to show other parts of the invention in detail. Fig. 2 is a central sectional view of one form of tiltable headlight construction adapted to be associated with the actuating mechanism shown in Fig. 1. Fig. 3 is a central sectional view of several of the parts shown in Fig. 1, but showing said parts in a different position.

Heretofore in the motor vehicle art, headlights have been tiltably mounted, or the lamps therein have been tiltably mounted, and in some instances the reflectors have been tiltably mounted, one of said last mentioned constructions being illustrated in the present application and being described in detail in a co-pending application, Serial No. 360,579, filed February 24, 1920. The present invention, however, is adapted to be associated with a suitably tiltable headlight construction of any of the foregoing types enumerated, Fig. 2 of the drawings being illustrative rather than restrictive in character.

Heretofore in the art, it has been common to actuate or tilt a tiltable headlight construction by means terminating in the driver's compartment of the vehicle. Some of these actuating mechanisms have been positioned upon the dash of the vehicle and others have been supported upon the steering column, post or tube in adjuxtaposition to the steering wheel thereof. Thus, all of the mechanisms terminating in the driver's compartment have required that the driver operate the same by using his hand or hands, requiring the removal of the driver's hand from the steering mechanism to the lighting mechanism, and coincident therewith the diversion of the driver's attention from the driving of the vehicle to the headlighting thereof. The present invention seeks to avoid the diversion of the driver's attention from the driving of the vehicle to the headlighting thereof by providing a pedal operated mechanism rather than a hand operated mechanism for actuating the tiltable headlight construction or constructions. The mechanism shown herein is adapted to tilt a tiltably mounted headlight, a tiltably mounted lamp, a tiltably mounted reflector, a tiltably mounted lamp and reflector, or any other tiltably mounted headlight construction without departing from the broad and specific features of the invention.

In the drawings 10 indicates the toe board or foot board, 11 indicates the steering column, tube or post extending through said toe board of a motor vehicle. A housing member 12 is suitably secured to and adjustable upon the steering post 11 by means hereinafter to be described, and a pedal actuatable rod member 13 is slidably mounted in said housing 12 and extends through the same. The upper end of said rod extends through an opening 14 in the toe board and terminates adjacent thereto, and said end is provided with a pad 15 suitably secured to the free end of said rod and providing an engageable portion for the operator's foot. The housing 12 is provided with a plurality of projecting bracket portions, such as the arms 16 and 17, which are provided with an engaging and clamping portion. Associated with each of the engaging and clamping arm portions 16 and 17 is a complementary clamping bracket 18 secured to said brackets by the bolts 19. Thus, the housing 12 may be adjustably secured upon the steering post 11 and is rigidly clamped to and supported upon the steering post or tube, which is stationarily mounted in the present construction. The housing 12 may be otherwise supported upon the chassis frame or other stationary portion of the vehicle, if desired, or required, without departing from the broader features of the invention. The housing 12 is provided with depending bracket portions or plates 20, which plates in the present construction are indicated as being formed integral with the arms 17. The plates 20, therefore, form a channel between the same, since said plates are in spaced relation with each other, and said plates terminate in the bearings 21 in which is rotatably mounted the shaft or pivot 22. Between the plates 20 and upon the shaft 22 is secured a lever 23, and slidably mounted between said plates is a clevis member 24 connected at one end by the clevis pin or pivot 25 to the lever 23. The other end of the clevis is secured to the actuating rod 13, said rod having an exteriorly threaded end which extends through and beyond the housing 12 into a threaded engagement with the interiorly threaded clevis 24. The actuating rod is thus adapted to be adjustably positioned in the clevis 24 and locked therein by means of the nut 26. Suitably secured to and tiltable by the rock shaft or pivot 21 is a lever 27, one end of which pivotally supports a reciprocating rod 28. The other end of said rod is suitably connected to the tiltable headlight construction in such a manner that said headlight construction may be tilted from the tilted position to the forward or straight-away position and vice versa as desired.

The invention is illustrated as associated with the tiltable headlight construction shown in Fig. 2. And in the present tiltable headlight construction associated with the invention 110 indicates a headlight casing, 111 a reflector tiltably mounted therein, 112 a post, standard or supporting means associated with the casing and suitably supported upon a bracket 113 in turn suitably supported by the motor vehicle in any desired manner, such as that illustrated in the copending application, Serial No. 361,385, filed February 26, 1920 for "mounting for headlights."

The tilting mechanism associated with the tiltably mounted reflector comprises a bell crank 114 tiltably mounted in said reflector, the link bar 115 operatively connected at one end to one end of the bell crank, and at the other end to the reflector, and a spring 116 having one end stationarily secured within said casing and the other end secured to the reflector such that said spring will normally maintain the tiltable reflector in the tilted position as indicated by the full lines in Fig. 2 until such time as the bell crank lever 114 is tilted or rocked into the dotted line position to tilt or rock the reflector into the nontilted, forward or straight-away position. The means for rocking the bell crank 114 to tilt the reflector from the tiltable position to the nontiltable position comprises a plunger 117 slidably supported by the casing 110 and extending through the same such that one end engages the other end of the bell crank 114, and the other end of said plunger is engaged by means associated with a lever 118. The lever 118 is suitably secured to and upon a rock shaft 119, which rock shaft is rotatably mounted in the bracket or lug means 121 secured to the bracket 113, and in the present instance is illustrated as formed integral therewith. The means for rocking the shaft 119 comprises a lever 120 suitably secured thereto and connected at one end to the rod 28 hereinbefore described. Hence movement of the rod 28 through the levers 120 from the full line position to the dotted line position will move the reflector from the full line position to the dotted line position and maintain said reflector in said dotted line position until such time as the rod 28 is moved so that the lever 120 is returned to the full line position.

The means for reciprocating the rod 28 to tilt the reflector 111 is contained within the housing 12 and is illustrated in detail in Figs. 1 and 3. In Fig. 1 the full line position of the parts illustrated correspond with the full line position of the tilting mechanism associated with the headlight construction and the full line position of the reflector; while the dotted line position of the parts illustrated and also the position of the parts as indicated in Fig. 3 correspond with the dotted line position of the parts illustrated in Fig. 2.

The particular means associated with the rod 13 comprises a tubular portion of the housing 12, which tubular portion is provided with a threaded upper end 30, closed by a plug member 31 exteriorly threaded and provided with a central opening 32, as shown clearly in Fig. 3, which central opening slidably supports the rod 13. The rod 13 is provided with a relieved portion 33 such that said relieved portion is adapted to coöperate with the central opening 32 in the plug member so as to latch the rod 13 in the depressed position as illustrated in Fig. 3, the mechanism associated therewith being moved to the dotted line positions indicated in Figs. 1 and 2.

The means for maintaining the rod 13 in the latched position until such time as it is desired to have said rod returned to the full line position as shown in Fig. 1 comprises a bolt chamber 34 formed in and communicating with the housing 12, and in the present instance said bolt chamber is preferably formed in the upper bracket portion 16, the end of said chamber being closed by an adjustably positioned plug member 35. Also positioned within the chamber 13 is a pawl or latching bolt 36, said pawl or bolt having a semi-spherical engaging portion and a hollow cylindrical body portion. Within the body portion and supporting one end thereof is a spring 37, the other end of said spring bearing against the plug member 35, and as hereinbefore described, the tension of the spring member 37 is adjusted by means of the plug member 35. The bolt 36 thus is slidably supported in the recess or bolt chamber 34 and is yieldingly forced outwardly from the same into the tubular housing portion 12 and into engagement with the rod 13 such that when the rod 13 is moved to the depressed position shown in Fig. 3, said pawl or bolt will lock said rod in said position, due to the coöperation of the relieved portion 33 of said rod and the central opening 32 of the plug member 31. Thus, sideward movement of the rod 13 will force the bolt or pawl 36 inwardly into the chamber 34 and permit the rod 13 to be released from the position in which the same has been latched and moved to the full line position shown in Fig. 1 by suitable means.

The means for moving the rod from the position shown in Fig. 3 to the position shown in Fig. 1 when the latching means hereinbefore described is released, comprises a coil spring 40, which spring is positioned within the housing 12 and is concentrically positioned with respect to the rod 13. Upon the rod 13 adjacent one end of the spring 40 is a retaining washer 41, and said washer is suitably secured in position upon said rod 13 by suitable means such as the curved portion 42 of said rod, or by other equivalent means. The other end of the spring 40 is secured within the housing 12 by means of the inwardly extending annular flange 43 providing the central opening 44 therethrough and through which the threaded portion of the rod 13 freely extends. To adjust the tension of the spring 40, suitable means is provided, and in the present instance said means is also provided with cushioning means, thereby serving a double purpose. Said cushioning means and tension adjusting means comprises a cushioning washer 45 suitably supported upon a plate or fitting 46, the position of said plate or fitting being adjusted by the same having a threaded engagement with the threaded portion of the rod 13 and being secured in said position by means of the lock nut 47.

Thus, when the locking pawl 36 is moved from the position shown in Fig. 3 to the position shown in Fig. 1, the spring 40 forces the rod 13 from the position shown in Fig. 3 to the position shown in Fig. 1, and at the end of the upward movement of said rod, the cushion 45 engages upon the inward flange 43 to not only limit said movement, but to cushion the same so that the operation of the mechanism is substantially noiseless.

It will, therefore, be understood that the mechanism may be locked in the straight-away, forward or non-tilted position, or may be maintained in the tilted position, and the mechanism for maintaining said actuating means hereinbefore described in either of said positions is adapted to be operated by the foot of the driver of the motor vehicle, thereby permitting said driver to devote his entire attention to the driving of the vehicle and not to the headlighting thereof.

The invention claimed is:

1. A control mechanism including an actuating rod, a housing surrounding said rod and having an opening through which the rod extends, and a chamber extending transversely of the housing and communicating therewith, a latching plunger yieldingly supported in said transverse chamber, said rod having a portion thereof coöperating with the opening in the housing to lock the rod in one position, and spring means within the housing exerting longitudinal force on said rod to move the same when released.

2. A control mechanism including an actuating rod, a housing surrounding said rod and having an opening through which the rod extends, and a chamber extending transversely of the housing and communicating therewith, a latching plunger yieldingly supported in said transverse chamber, said rod having a portion thereof coöperating with the opening in the housing to lock the rod in one position, spring means within the housing exerting longitudinal force on said rod to move the same when released, and means upon the rod coöperating with the housing for adjusting the tension of the spring means.

3. A control mechanism including an actuating rod, a housing surrounding said rod and having an opening through which the rod extends, and a chamber extending transversely of the housing and communicating therewith, a latching plunger in said transverse chamber, yielding means for said plunger and positioned in said transverse chamber, adjusting means associated with said yielding means for adjusting the tension of the plunger yielding means, said plunger latching said rod in the locked position, and spring means within the housing exerting a longitudinal force on said rod to move the same when released.

4. A control mechanism including an actuating rod, a housing surrounding said rod and having an opening through which the rod extends, and a chamber extending transversely of the housing and communicating therewith, a latching plunger in said transverse chamber, yielding means for said plunger and positioned in said transverse chamber, adjusting means associated with said yielding means for adjusting the tension of the plunger yielding means, said plunger latching said rod in the locked position, spring means within the housing exerting a longitudinal force on said rod to move the same when released, and means upon the rod and coöperating with the housing for adjusting the tension of said spring means.

5. A control mechanism including an actuating rod, manually engageable means upon one end of said rod, other means upon the other end of said rod, for actuation purposes, a spring for normally forcing said rod in one direction, yielding means coöperating with said rod to latch the same in one direction and the spring under tension, cushion means associated with said rod for cushioning the movement of said rod upon the actuation thereof by the spring, and means for simultaneously adjusting the travel of said rod and the tension of said spring.

In witness whereof, I have hereunto affixed my signature.

HARVEY LEE WATSON.